UNITED STATES PATENT OFFICE.

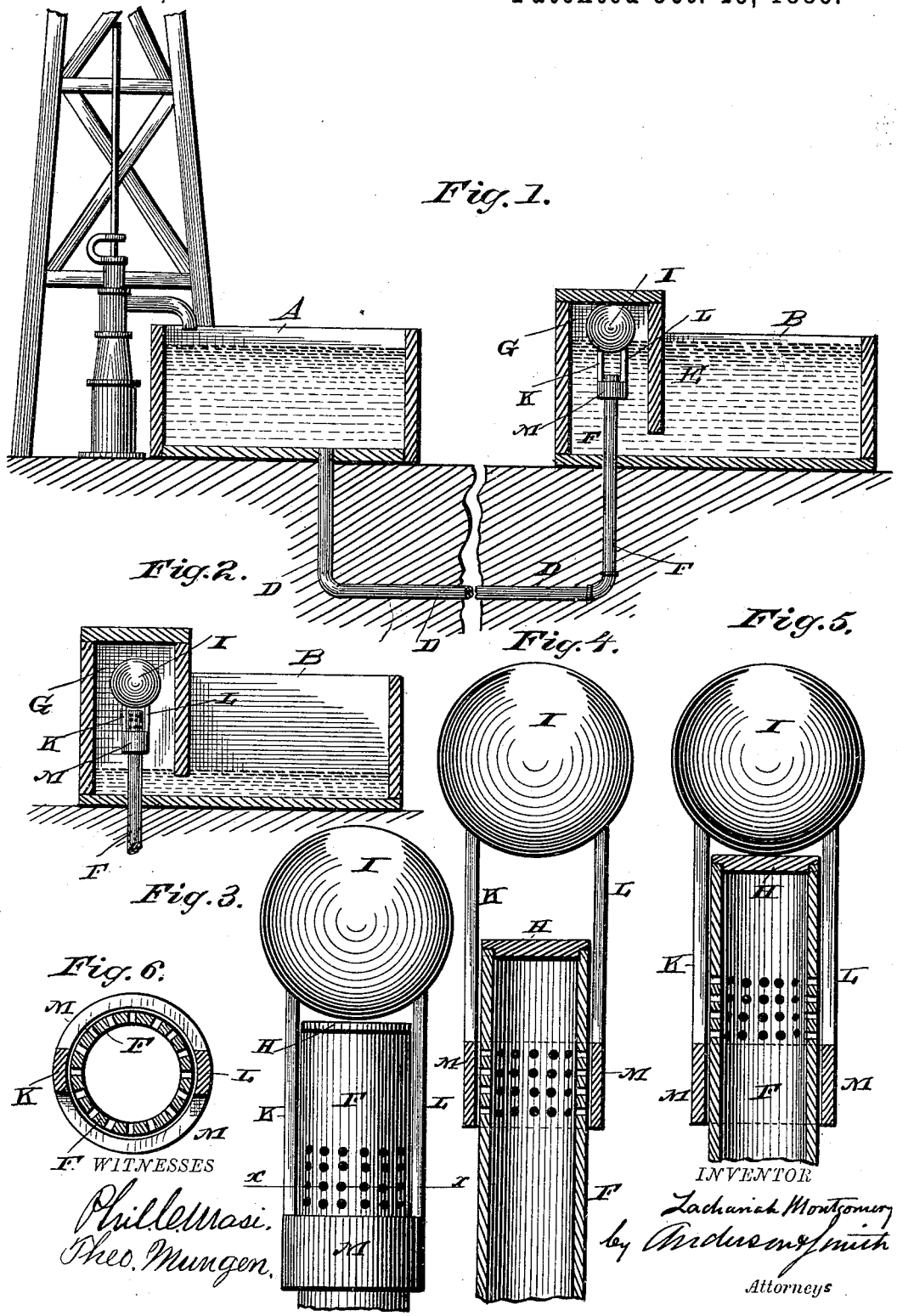

ZACHARIAH MONTGOMERY, OF ST. JOSEPH, MISSOURI.

AUTOMATIC STOCK-WATERING TROUGH.

SPECIFICATION forming part of Letters Patent No. 351,200, dated October 19, 1886.

Application filed July 27, 1886. Serial No. 209,241. (No model.)

*To all whom it may concern:*

Be it known that I, ZACHARIAH MONTGOMERY, a citizen of the United States, residing at St. Joseph, in the county of Buchanan and State of Missouri, have invented certain new and useful Improvements in Automatic Stock-Watering Troughs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation in vertical section of a tank and trough, showing the float up and closed. Fig. 2 is a section of the trough, showing the float down and open. Fig. 3 is an enlarged side elevation of the float, showing same open. Fig. 4 is an enlarged vertical section of the same, showing float closed. Fig. 5 is a similar section showing the float open; and Fig. 6 is a horizontal section taken on the line $x\,x$, Fig. 3.

My invention relates to stock-waterers; and it consists in the construction and novel combination of parts as hereinafter described, and pointed out in the claims.

Referring by letter to the accompanying drawings, A designates a water-tank which is located at the windmill, so that it can be conveniently filled by the pump which is operated by said windmill.

B designates a watering-trough, which may be located at any convenient or desirable distance from the tank, said trough B being connected with the tank by a pipe, D, which is laid in the ground far enough below the surface to prevent the water in the pipe from freezing in the winter time and bursting the pipe. Any desired number of watering-troughs may be connected with the supply-pipe D; but as these troughs are similar in construction a description of one will answer for all. The trough B is preferably a rectangular box, which is provided a short distance from one end with a vertical partition, E, which extends downwardly from the upper edge of the trough, but does not quite reach to the bottom of the box.

From the supply-pipe D a vertical section of pipe F, which taps the supply-pipe, extends up into the smaller compartment G of the trough. The upper end of the vertical pipe F is closed or plugged up, and immediately below the plug H are made a series of perforations which extend entirely around the pipe.

I designates a float which is provided with two depending arms, K L, which carry at their lower ends a sleeve or band, M, which is slightly greater in width than the width of the perforated portion of the pipe F, so that the sleeve M may cover and close the perforations when the float is raised by the water in the trough to the proper height. When the water has flowed into the trough long enough to raise the float and cause the sleeve to cover the perforations below the plug in the end of the pipe F, the water will be automatically shut off from the trough, and will not again flow into the same until the cattle have drank enough from the larger compartment to cause the float to descend as the surface of the water is lowered. Then the water will again flow through the perforations in the pipe F until the float rises and the sleeve closes the perforations in the pipe. That portion of the trough containing the float is covered, so that stock cannot interfere with the action thereof. In winter time the float-chamber should be packed around with manure or some other suitable material, to keep the water from freezing and preventing the float from operating automatically, as above described. In this construction there are no valves to get out of order, and the float is simple and certain in its action.

Having described this invention, what I claim, and desire to secure by Letters Patent, is—

1. The combination, with the trough provided with a partition, and an interspace between the bottom of the trough and the lower edge of the partition, of the pipe D, the vertical pipe provided with perforations around its closed upper end, and the float provided with the depending arms carrying a sleeve at their lower ends adapted to close and open the perforations in said pipe, substantially as specified.

2. In a stock-watering apparatus, the combination, with the trough B, tank A, and the pipe D, connecting the tank with the trough, of the pipe F, leading from the pipe D and through the bottom of the trough, and provided with perforations near its upper end, the ring M, loosely arranged around the said vertical pipe, the float, and arms connecting the float with the ring, and the compartment or housing in the trough for the float, substantially as specified.

In testimony whereof I affix my signature in presence of two witnesses.

ZACHARIAH MONTGOMERY.

Witnesses:
    WM. J. LOVELL,
    GEORGE R. ESTES.